April 14, 1953 T. J. HAVILAND 2,635,034
TRACE IDENTIFYING DEVICE FOR RECORDING OSCILLOGRAPHS
Filed Feb. 28, 1949 3 Sheets-Sheet 1

INVENTOR.
THOMAS J. HAVILAND
BY
ATTORNEY

April 14, 1953

T. J. HAVILAND 2,635,034

TRACE IDENTIFYING DEVICE FOR RECORDING OSCILLOGRAPHS

Filed Feb. 28, 1949

INVENTOR.
THOMAS J. HAVILAND
BY

ATTORNEY

April 14, 1953 T. J. HAVILAND 2,635,034
TRACE IDENTIFYING DEVICE FOR RECORDING OSCILLOGRAPHS
Filed Feb. 28, 1949 3 Sheets-Sheet 3

*INVENTOR.*
*THOMAS J. HAVILAND*
BY
ATTORNEY

Patented Apr. 14, 1953

2,635,034

UNITED STATES PATENT OFFICE 2,635,034

TRACE IDENTIFYING DEVICE FOR RECORDING OSCILLOGRAPHS

Thomas J. Haviland, Brookville, Md., assignor to the United States of America as represented by the Secretary of the Navy Application February 28, 1949, Serial No. 78,808

8 Claims. (Cl. 346—109)

This invention relates to a process and device for identifying the individual traces made by a recording oscillograph. More specifically the invention relates to photographic recorders wherein traces of a multiplicity of variables are made concurrently. The invention consists in providing means whereby each trace bears a periodically repeated identifying characteristic, with the corresponding characteristics of the various individual traces, however, being out of "time alinement" with one another.

Heretofore various means of identifying concurrent traces on the same paper strip have been suggested, but none was found that repeated its operations consecutively.

The object of the invention is to make it possible to follow the various traces without mistake, even though they cross and recross one another, or run together for a time and then again separate.

Other objects and many of the attendant advantages of this invention will be appreciated readily as the same becomes understood by reference to the following detailed description, when considered in connection with the accompanying drawings, wherein.

A general description of so much of the instrument structure as is necessary to an understanding of the purpose and operation of the structure added in accordance with the invention will first be given.

Figure 1:
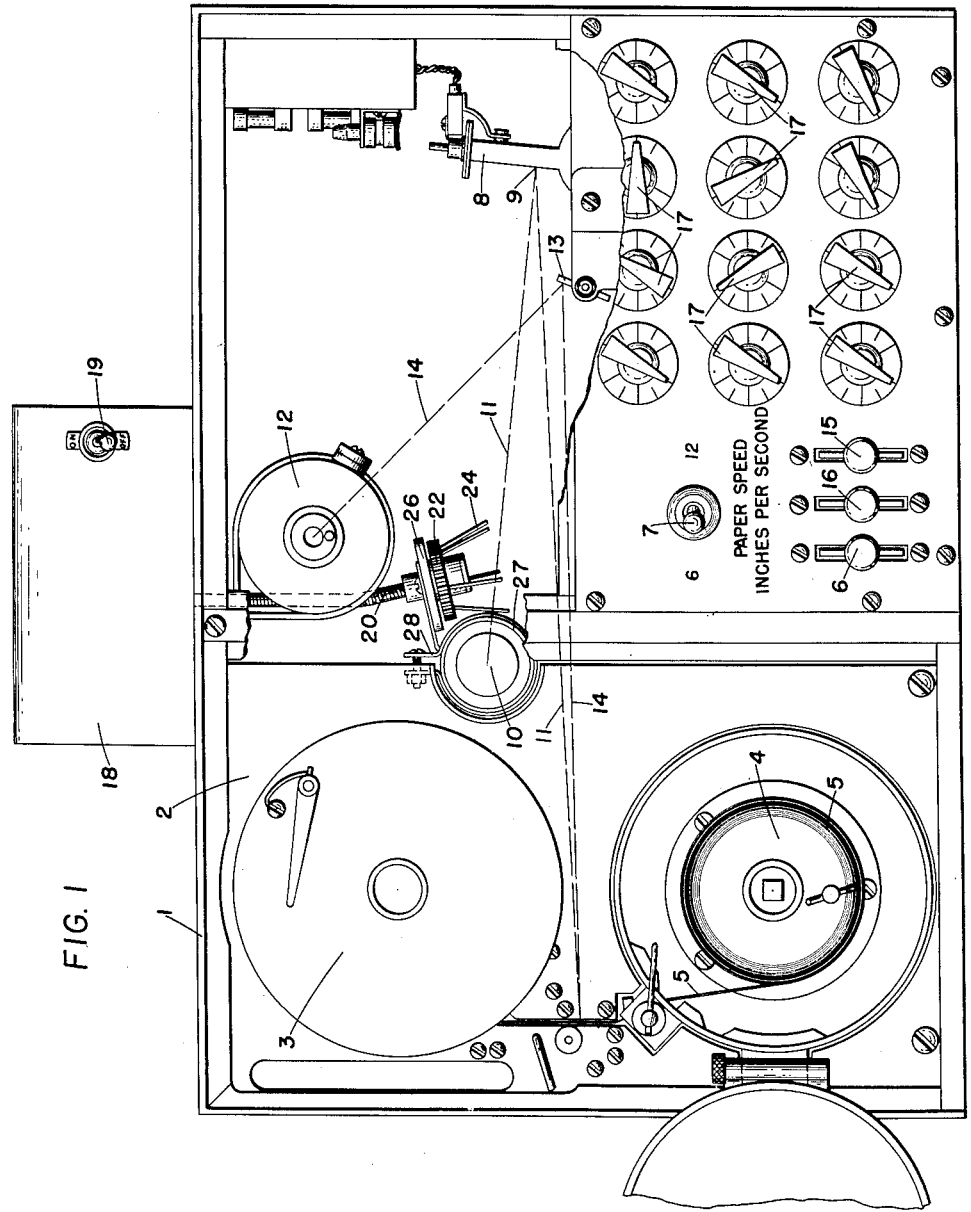
Fig. 1 shows the invention as applied to a standard oscillograph, of the type wherein narrow beams of light are reflected from tiny mirrors associated with galvanometer movements, and cast images on a moving strip of photographically sensitive material, to produce developable traces, the case of the oscillograph being shown in side elevation, partly broken away.

Fig. 1 shows a case 1 divided into suitable compartments, the front compartment 2 containing the supply reel 3 and the take-up reel 4 for the roll of sensitive paper 5. An electric motor actuates these reels and is controlled by the on-off switch 6 and the speed-selection switch 7. In the region between the reels the paper is exposed to light beams coming from the respective galvanometer heads, only one of which, here designated 8, is illustrated. It will be understood that an arbitrary number of such heads may be provided; for instance, there are twelve in the specific oscillograph on which the instant invention is drawn. Each head has a small mirror 9, deflectable by the associated galvanometer movement, that will reflect light from a source 10 to that portion of the sensitive paper that is at the time between the reels, a representative light-path 11 being shown.

As the paper feeds across the region where exposure takes place, coordinate ruling is provided thereon by the device 12, which comprises a light source and a cylinder rotating around it at a definite rate, suitably one revolution per second. This cylinder is opaque but has ten equally spaced slots extending lengthwise thereof to permit light to pass at one-tenth second intervals to a mirror 13 and thence to the paper 5, a flat beam 14 of light being shown. One of the slots is slightly wider than the remaining nine, and produces a thicker line, for easy reading of the record. A suitable switch 15 turns the light 10 on or off, and another switch 16 controls the motor-and-light device 12. Knobs 17, 17, control the relative sensitivities of the various galvanometers.

Figure 6:
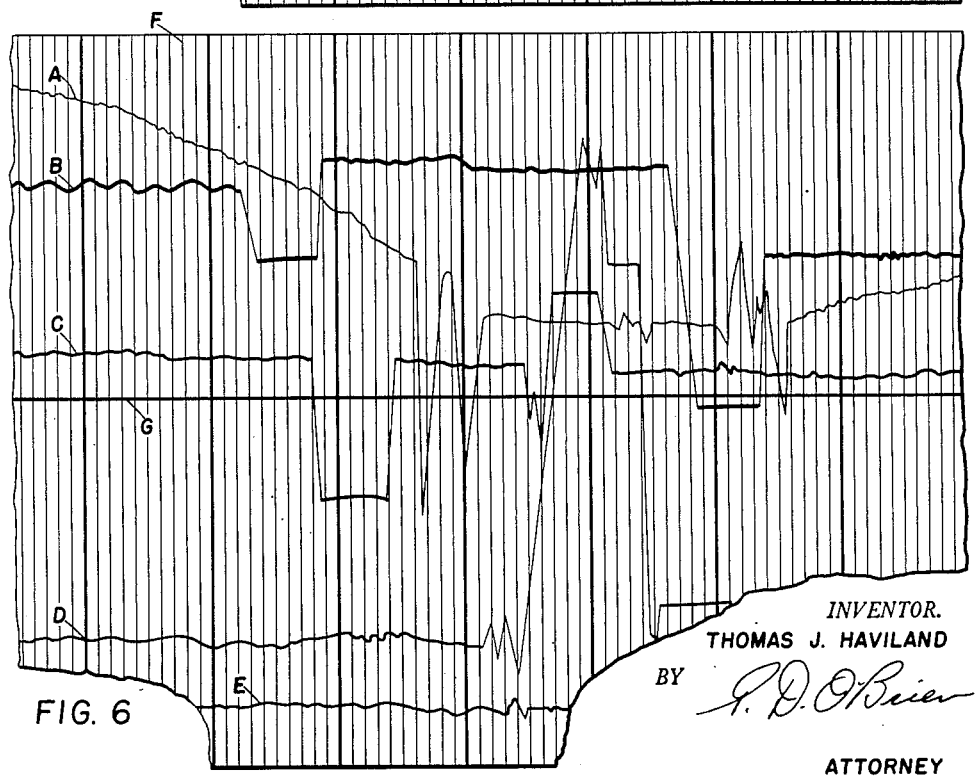
Fig. 6 is the same fragment as it would appear without making use of the invention.

All the structure described above is old and does not form part of the present invention. In operation, assuming that five of the galvanometers are in use, a record such as shown in Fig. 6 will be produced on development of the exposed sensitive paper strip. The individual traces are designated A, B, C, D and E respectively. It will be seen that these traces may cross and recross one another in such intricate ways that it sometimes becomes difficult to determine which is which, and in case two traces should become coincident for a time, it might actually be impossible to identify them after they separate. It will be understood that the transverse rulings F on the paper are produced by the device 12, and the central longitudinal reference line G is produced by the mirror 9 of one of the galvanometer heads, that is not in use to record a variable, and is adjusted to throw a stationary beam of light to the center of the paper 5.

Figure 2:
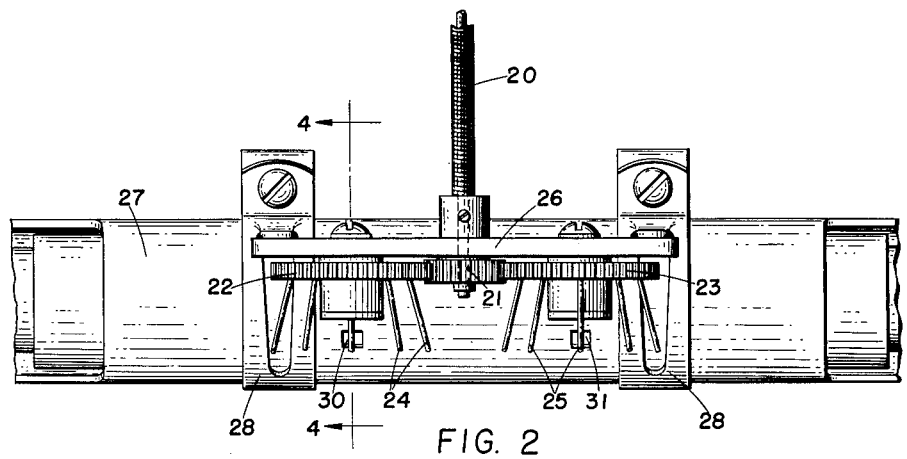
Fig. 2 is an enlarged side elevation of trace interrupting means that coact with the oscillograph in accordance with the invention.

Referring to Figs. 1, and 2, the invention will now be described. A synchronous motor and reduction gearing 18, provided with an on-off switch 19, are mounted on top of the case 1 as shown. A flexible shaft 20 extends down from this device into the case, terminating in a pinion 21 as shown in Fig. 2. Pinion 21 is in mesh with two gears 22 and 23, located on opposite sides thereof and each such gear has five stiff wires or opaque members that constitute shadow-casting or occulting means projecting therefrom, as shown at 24 and 25.

These gears and drive pinion are mounted on a plate 26 secured to the outside of a lamp shield 27 that surrounds the light source 10. A preferred way of holding the plate 26 in position is to provide expansible clamps 28 of the "hose-clamp" type, to which the plate 26 may be secured in any preferred way, as by screws, solder, welding, etc.

Figure 3:
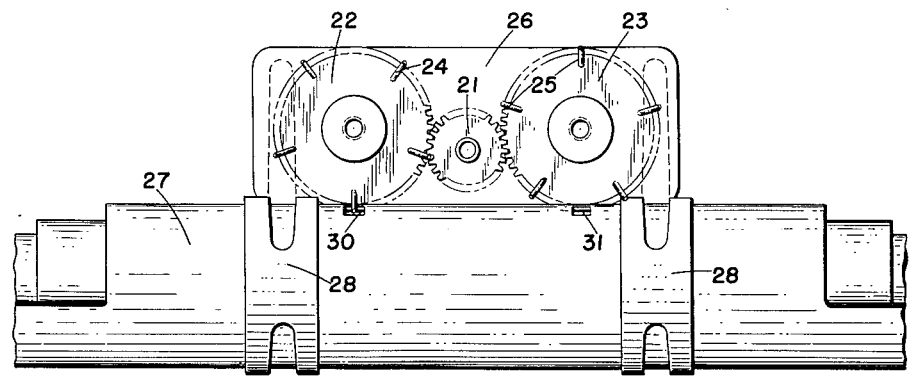
Fig. 3 is a corresponding bottom view.
Figure 4:
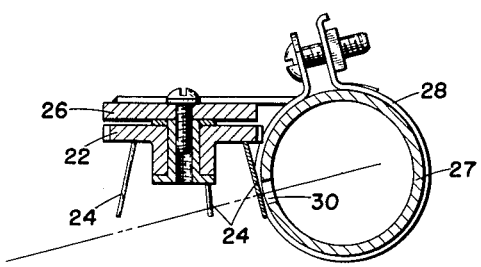
Fig. 4 is a section through the trace interrupting means, on the plane 4—4 of Fig. 2.

Referring now more particularly to Figs. 2, 3 and 4, it will be seen that there are two small windows 30 and 31, cut through the wall of the light shield 27, and that the axes of the gears 22 and 23 are in line with the respective windows. The motor in element 13 is of the synchronous type and has a reduction gear connected thereto, the net result being that the flexible shaft is turned, for example, at the rate of 20 revolutions per minute. A further speed reduction is provided by the pinion 21 and gears 22, 23, the ratio of this drive being here arbitrarily 13:30, so that the gears 22, 23 rotate at approximately 9 R. P. M. With five wires 24 or 25, this means 45 light interruptions per minute, each of which produces a shadow, and thereby a break or other identifying characteristics, in each trace.

It is to be borne in mind that the diameter of the wires 24 and 25 that produce the shadows is important, to the extent that if these wires are too slender their shadows will not completely cover or occult the respective galvanometer mirrows 9, and, hence, will not produce actual complete interruptions of the traces, but merely dimming or thinning thereof. On the other hand, wires that are a little too great in diameter will cast excessively wide shadows, thus causing needless loss of the records, due to unnecessarily long breaks therein. If the wires are made still thicker, the shadows will not be confined to single galvanometer heads, but will at times spread partly over two adjacent heads, producing confusion in the interruptions.

A certain degree of adjustability is afforded by turning the plate 26 about the axis of the lamp shield 27, after loosening the clamps 28, 28, thus varying the spacing of the wires or pins 24 and 25 from their coacting windows 30 and 31 to produce exactly the desired shadow width.

The actual number of interruptions in a given time is unimportant, for the present purpose, although it is highly convenient to make the number such that the resulting breaks in each trace are a decimal number of units apart, as will be made clear hereinafter. The number may be changed by changing the number of shadow-casting means on the gears, or by changing the gear ratios, or by both combined, as will be obvious.

The operation of the device is as follows:

Each wire casts a shadow that moves across the array of galvanometer heads, the two gears 22 and 23 being so meshed with the pinion 21 that the wires carried by said gears are "staggered"; that is, when a wire of one gear is centered across its window, the other gear will be in such position that the other window is halfway between wires. By careful adjustment, the shadow of one wire will thus move across a corresponding half of the array of heads, whereupon the appropriate wire of the second gear will come into position to start its own shadow across the remaining half of the array, so that upon casual observation it seems that only a single shadow is cast, and that the latter moves across the complete array.

Figure 5:
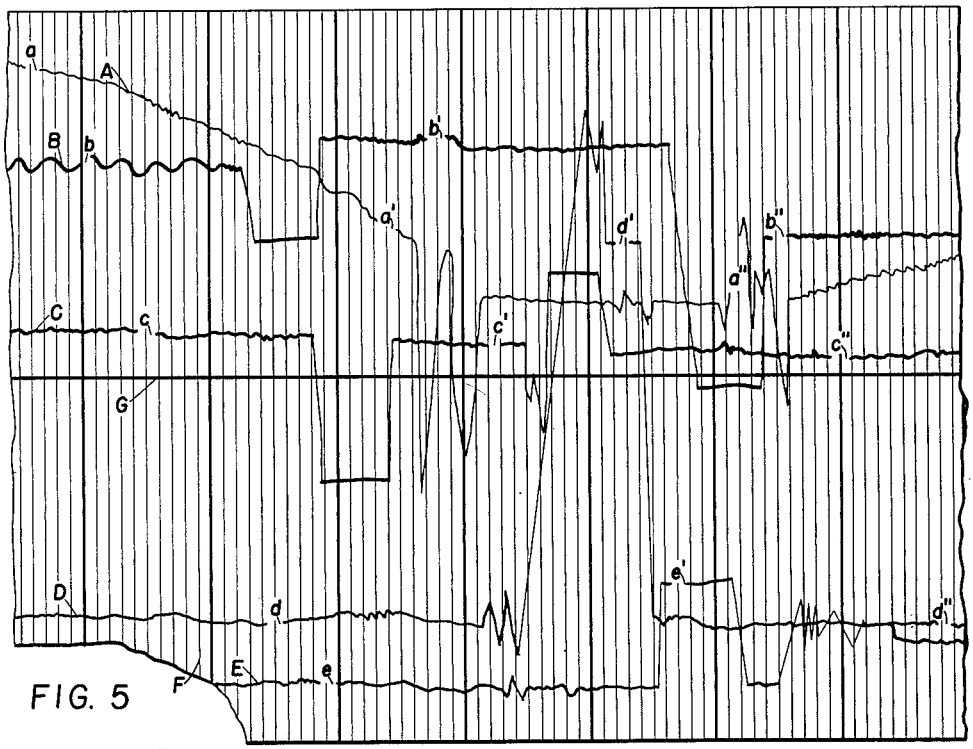
Fig. 5 is a representation of a fragment of a record strip made by the oscillograph with the invention applied thereto.

While the shadow passes each mirror, the corresponding image is lacking on the sensitive paper, with the result that a break as shown in Fig. 5 is produced at $a$ in trace A, at $b$ in trace B, at $c$ in trace C, at $d$ in trace D, and at $e$ in trace E, these breaks being at progressively greater distances from the starting end of the paper strip. A second break $a'$ then appears in trace A, $b'$ in trace B, and so on through successive multiple primes.

The distances, longitudinally of the paper strip, between $a$ and $a'$, $a'$ and $a''$, $a''$ and $a'''$, are all equal, as are those between $b$ and $b'$, $b'$ and $b''$, $b''$ and $b'''$ and likewise those between the $c$, $d$, and $e$ series. However, no two breaks are alined crosswise of the paper strip, thus making it easy to identify each trace by noting where the respective breaks appear.

The convenience of having the longitudinal interval between breaks in any trace equal to a decimal number of time units will now be evident. In the strips illustrated, each large division is divided into ten small ones, and if now the breaks are ten, twenty, thirty, or similar decades of units apart, it becomes an easy matter to check their locations, to identify the separate traces, which would not be true, for instance, if the interval arbitrarily were 23½ units 17 units or the like.

As long as the traces do not change their relative positions on the paper strip, the respective breaks will lie in order on said traces, approximately on a somewhat inclined straight line; for example, the breaks $a$, $b$, $c$, $d$, and $e$, and this fact assists in identifying the traces. However, even when the traces have changed their relative positions, the breaks will still remain, longitudinally, adjacent one another, as $a''$, $b''$, $c''$, $d''$, and $e''$ so that when a break appears in one trace, the others may be sought in the same vicinity.

Obviously many modifications and variations of the invention are possible in the light of the above teachings. It is, therefore, to be understood that within the scope of the appended claims the invention may be practiced otherwise than as specifically described.

What is claimed is:

1. The combination comprising a photographic recorder having a plurality of light beam controllers for making concurrently a plurality of records by individual light beams, and record identifying means including means for interrupting the light beams successively, but all at the same equal time intervals, said means including a shadow-casting device and means for maintaining said device in uniform motion.

2. The combination defined in claim 1, wherein the shadow-casting device is a pin mounted for rotation about an axis other than its own.

3. The combination defined in claim 1, wherein the shadow-casting device comprises a number of symmetrically arranged pins mounted for rotation about a common axis.

4. The combination defined in claim 1, wherein the shadow-casting device comprises two sets of symmetrically arranged pins each set being mounted for rotation about a corresponding common axis, and the two sets being interconnected to rotate in unison.

5. In combination, a recording instrument including a light source, a plurality of light beam deflecting elements illuminated by said source, a record strip, said deflecting elements being operative to produce simultaneously a plurality of crossing and recrossing record traces on said record strip and means for facilitating the identification of the individual record traces, including an opaque member of sufficient width to substantially occult a deflecting element from said source, and driving mechanism for periodically traversing said opaque member across said light source to successively occult said deflecting elements for sufficient time intervals to produce periodically an identifiable characteristic in the trace produced by each element.

6. In combination, a recording instrument including a light source, a plurality of light beam deflecting elements illuminated by said source, a record strip, said deflecting elements being operative to simultaneously produce a plurality of crossing and recrossing record traces on said record strip, and means for facilitating the identification of the individual record traces, said means including a plurality of pins mounted for rotation about an axis so that said pins successively move across the light path between said source and said deflectors to successively shadow said deflecting elements for sufficient time intervals to periodically produce an identifiable characteristic in the trace produced by each element.

7. In combination with a multi-element recording instrument utilizing a plurality of light beam deflectors for simultaneously producing a plurality of record traces on a strip of record material, means for facilitating identification of the individual traces on the record strip, which comprises a source of light for said deflectors, and means for periodically and successively occulting the beam deflectors for a period of sufficient length to produce a clearly defined discontinuity of the traces.

8. In combination with a multi-element recording instrument utilizing a plurality of light beam deflectors for simultaneously producing a plurality of record traces on a strip of record material, means for facilitating the identification of the individual traces on the record strip, which comprises a source of light for said deflectors, a pin mounted on an axis adjacent the path of light from said source to said deflectors, and means for rotating said pin about said axis for periodically and successively shading the beam deflectors for a period of sufficient length to produce a clearly defined discontinuity of the traces produced by the deflectors.

THOMAS J. HAVILAND.

References Cited in the file of this patent

UNITED STATES PATENTS

| Number | Name | Date |
|---|---|---|
| 919,467 | Robinson | Apr. 27, 1909 |
| 1,300,191 | Pogue | Apr. 8, 1919 |
| 1,787,940 | Garbutt | Jan. 6, 1931 |
| 1,871,380 | Legg | Aug. 9, 1932 |
| 2,083,375 | Hehlgans | June 8, 1937 |
| 2,247,908 | Dickinson | July 1, 1941 |
| 2,489,253 | Andre | Nov. 29, 1949 |

FOREIGN PATENTS

| Number | Country | Date |
|---|---|---|
| 384,692 | Great Britain | Dec. 15, 1932 |
| 633,079 | Great Britain | Dec. 12, 1949 |